US012651836B2

(12) United States Patent
Park et al.

(10) Patent No.: US 12,651,836 B2
(45) Date of Patent: Jun. 9, 2026

(54) ANTENNA STRUCTURE

(71) Applicant: DONGWOO FINE-CHEM CO., LTD., Jeollabuk-do (KR)

(72) Inventors: Hee Jun Park, Gyeonggi-do (KR); Young Ju Kim, Gyeonggi-do (KR); Won Hee Lee, Gyeonggi-do (KR); Sung Jin Han, Incheon (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 269 days.

(21) Appl. No.: 17/873,254

(22) Filed: Jul. 26, 2022

(65) Prior Publication Data

US 2023/0035171 A1 Feb. 2, 2023

(30) Foreign Application Priority Data

Jul. 27, 2021 (KR) ........................ 10-2021-0098712

(51) Int. Cl.
*H01Q 5/307* (2015.01)
*H01Q 1/24* (2006.01)
*H01Q 5/10* (2015.01)

(52) U.S. Cl.
CPC ............... *H01Q 5/307* (2015.01); *H01Q 1/24* (2013.01); *H01Q 5/10* (2015.01)

(58) Field of Classification Search
CPC ............ H01Q 5/307; H01Q 1/00; H01Q 1/24; H01Q 1/27; H01Q 1/28; H01Q 1/32; H01Q 1/36; H01Q 1/38; H01Q 1/44; H01Q 1/50; H01Q 1/52; H01Q 1/22; H01Q 13/00; H01Q 13/10; H01Q 21/00
See application file for complete search history.

(56) References Cited

U.S. PATENT DOCUMENTS 3,307,108 A * 2/1967 Induni ...................... H01Q 1/24 343/703
3,364,491 A * 1/1968 Stohr ...................... H01Q 9/40 343/807
4,864,314 A * 9/1989 Bond ...................... H01Q 5/42 343/897
2014/0333500 A1* 11/2014 Moon .................... H01Q 21/08 343/758

FOREIGN PATENT DOCUMENTS

EP 1 542 315 A1 6/2005
KR 10-2019952 B1 9/2019

OTHER PUBLICATIONS

Office action issued on Jan. 15, 2026 from Korean Patent Office in a counterpart Korean Patent Application No. 10-2021-0098712 (English translation is also submitted herewith.).

* cited by examiner

*Primary Examiner* — Anthony S Addy

(57) ABSTRACT

An antenna structure according to an embodiment of the present disclosure includes a transmission line, and a radiator connected to the transmission line, the radiator having a linear perimeter region and a plurality of curved perimeter regions separated by the linear perimeter region, wherein an outermost portion of the radiator from the transmission line in a planar view has any one of the curved peripheral regions. A broadband antenna structure covering low frequency and high frequency bands is provided.

15 Claims, 5 Drawing Sheets

ANTENNA STRUCTURE

CROSS-REFERENCE TO RELATED APPLICATION AND CLAIM OF PRIORITY

This application claims priority to Korean Patent Application No. 10-2021-0098712 filed on Jul. 27, 2021 in the Korean Intellectual Property Office (KIPO), the entire disclosures of which are incorporated by reference herein.

BACKGROUND

1. Field

The present invention relates to an antenna structure. More particularly, the present invention relates to an antenna structure including an antenna unit capable of radiating in a plurality of frequency bands.

2. Description of the Related Art

As information technologies have been developed, a wireless communication technology such as Wi-Fi, Bluetooth, etc., is applied or embedded in an image display device, an electronic device, an architecture, etc.

As mobile communication technologies have been rapidly developed, an antenna capable of operating a high frequency or ultra-high frequency communication is needed in various mobile devices.

Accordingly, implementation of radiation properties in a plurality of frequency bands using a single antenna device may be needed. In this case, high-frequency antenna and low-frequency antenna may be included in one device.

However, when antennas of different frequency bands are disposed to be adjacent to each other, radiation and impedance properties of different antennas may be interrupted and disturbed.

Additionally, when the antennas of different frequency bands are disposed to be separated from each other, a space for an antenna arrangement may increase, thereby deteriorating spatial efficiency and aesthetic properties of a structure to which an antenna device is applied.

SUMMARY

According to an aspect of the present invention, there is provided an antenna structure having improved radiation property and radiation reliability.

(1) An antenna structure, including: a transmission line; and a radiator connected to the transmission line, the radiator having a linear perimeter region and a plurality of curved perimeter regions separated by the linear perimeter region, wherein an outermost portion of the radiator from the transmission line in a plan view has any one of the curved peripheral regions.

(2) The antenna structure of the above (1), wherein the radiator includes a first radiating portion and a second radiating portion that are separated by the linear perimeter region.

(3) The antenna structure of the above (2), wherein the curved perimeter regions include a first curved perimeter and a second curved perimeter, and the first radiating portion has the first curved perimeter, and the second radiating portion has the second curved perimeter.

(4) The antenna structure of the above (3), wherein the radiator further includes a first intermediate portion disposed between the first radiating portion and the second radiating portion.

(5) The antenna structure of the above (4), wherein a first recess is formed at a boundary between the first radiating portion and the first intermediate portion.

(6) The antenna structure of the above (4), wherein the radiator further includes a second intermediate portion disposed between the second radiating portion and the transmission line.

(7) The antenna structure of the above (6), wherein a second recess is formed at a boundary between the second radiating portion and the second intermediate portion.

(8) The antenna structure of the above (6), wherein the first intermediate portion and the second intermediate portion each has a linear perimeter.

(9) The antenna structure of the above (3), wherein an average resonance frequency of the second radiating portion is greater than an average resonance frequency of the first radiating portion.

(10) The antenna structure of the above (9), wherein the second radiating portion has a radiation band of at least three frequency bands.

(11) The antenna structure of the above (1), further including a guide pattern disposed around the transmission line and physically spaced apart from the radiator and the transmission line.

(12) The antenna structure of the above (11), wherein the guide pattern has a first tapered lateral side, and the transmission line has a second tapered lateral side.

(13) The antenna structure of the above (12), wherein the first tapered lateral side and the second tapered lateral extend to face each other.

(14) The antenna structure of the above (13), wherein the transmission line includes a feeding portion and an expanded portion extending from the feeding portion to be connected to the radiator, and the expanded portion has the second tapered lateral side.

(15) The antenna structure of the above (14), wherein a pair of the guide patterns face each other with the feeding portion interposed therebetween.

(16) The antenna structure of the above (11), wherein the guide pattern serves as an auxiliary radiator through a coupling with the transmission line.

(17) A relay antenna including the antenna structure of claim 1.

According to embodiments of the present invention, an antenna unit included in an antenna structure may include a plurality of rounded regions. The rounded regions may be separated by a straight line region or a recessed portion, and a broadband antenna driven in a plurality of frequency bands may be efficiently implemented from a single radiator without a frequency collision.

In some embodiments, the antenna unit may include an auxiliary radiator physically separated from the radiator. A high-frequency band radiation may be added to the antenna unit by a coupling with the auxiliary radiator and a transmission line.

In exemplary embodiments, a broadband antenna having a plurality of resonance frequencies in a range from 0.1 MHz to 10 GHz may be implemented using the antenna structure.

DETAILED DESCRIPTION OF THE EMBODIMENTS

According to exemplary embodiments of the present invention, an antenna structure providing multi-frequency bands radiation from a single antenna unit.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
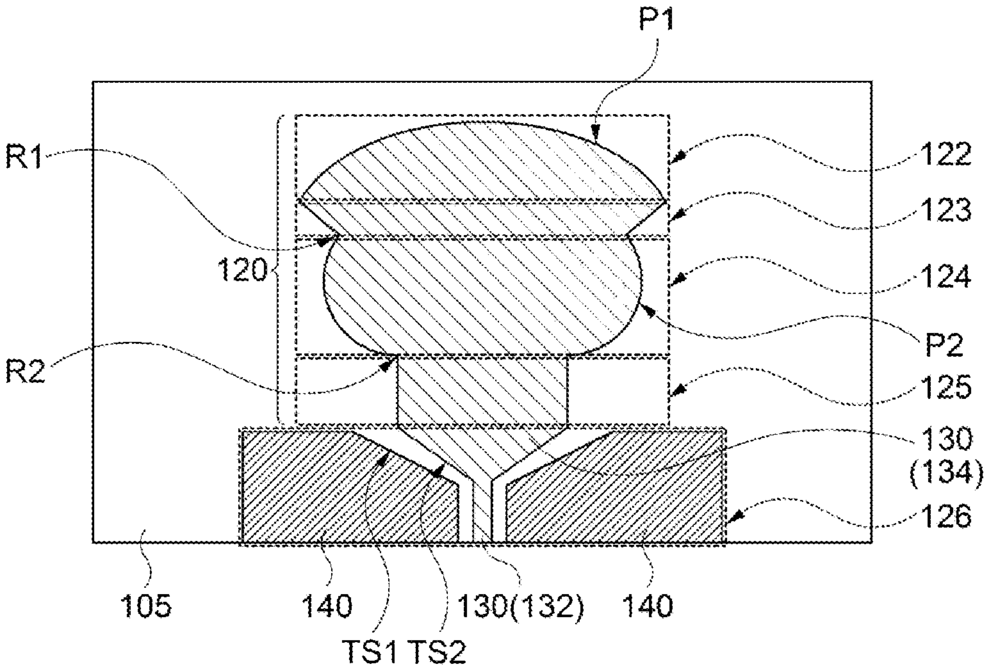
FIGS. 1 and 2 are a schematic plan view and a schematic cross-sectional view, respectively, illustrating an antenna structure in accordance with exemplary embodiments.
Figure 2:
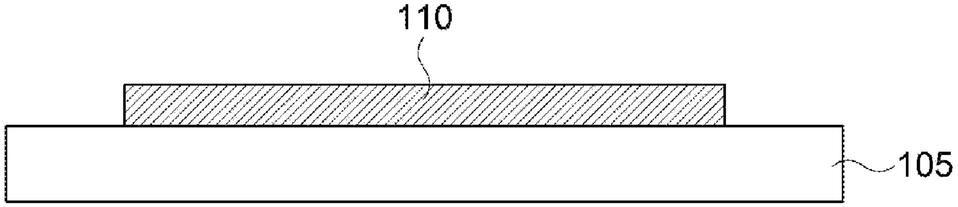

FIGS. 1 and 2 are a schematic plan view and a schematic cross-sectional view, respectively, illustrating an antenna structure in accordance with exemplary embodiments. For convenience of descriptions, detailed elements/structures of an antenna unit 110 is omitted in FIG. 2.

The antenna structure may include a dielectric layer 105 and the antenna unit 110 formed on the dielectric layer 105.

The dielectric layer 105 may include, e.g., a transparent resin material. For example, the dielectric layer 105 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin;

an allylate-based resin; a polyoxymethylene-based resin; an epoxy-based resin; a urethane or acrylic urethane-based resin; a silicone-based resin, etc. These may be used alone or in a combination of two or more thereof.

In some embodiments, the dielectric layer 105 may include an adhesive film such as an optically clear adhesive (OCA), an optically clear resin (OCR), or the like.

In some embodiments, the dielectric layer 105 may include an inorganic insulating material such as glass, silicon oxide, silicon nitride, silicon oxynitride, etc.

In an embodiment, the dielectric layer 105 may be provided as a substantially single layer.

In an embodiment, the dielectric layer 105 may include a multi-layered structure of at least two layers. For example, the dielectric layer 105 may include a substrate layer and an antenna dielectric layer, and may include an adhesive layer between the substrate layer and the antenna dielectric layer.

Capacitance or inductance may be formed by the dielectric layer 105, so that a frequency band at which the antenna structure may be driven or operated may be adjusted.

In some embodiments, a dielectric constant of the dielectric layer 105 may be adjusted in a range from about 1.5 to about 12. If the dielectric constant exceeds about 12, a driving frequency may be excessively decreased, and driving in a desired high frequency or ultrahigh frequency band may not be implemented.

The antenna unit 110 may include a radiator 120 and a transmission line 130 connected to the radiator 120. In exemplary embodiments, the antenna unit 110 may include a guide pattern 140 disposed around the transmission line 130 and physically spaced apart from the radiator 120 and the transmission line 130.

In exemplary embodiments, the antenna unit 110 may include a first radiating portion 122, a second radiating portion 124 and a third radiating portion 126, and may include a first intermediate portion 123 and a second intermediate portion 125. The first radiating portion 122, the second radiating portion 124, the first intermediate portion 123 and the second intermediate portion 125 may be included in the radiator 120, and may have different shapes and areas.

In some embodiments, the third radiating portion 126 may include the transmission line 130 and the guide pattern 140. In a plan view, the second intermediate portion 125, the second radiating portion 124, the first intermediate portion 123 and the first radiating portion 122 may be sequentially disposed from the transmission line 130.

The first radiating portion 122 may correspond to an uppermost or outermost portion of the radiator 120 in a length direction of the antenna unit 110 from the transmission line 140 in the plan view. In exemplary embodiments, the first radiating portion 122 may have a first curved perimeter P1. The first curved perimeter P1 may have a convex shape toward an outside of the radiator 120.

The first radiating portion 122 may be provided as a low-frequency radiator of the radiator 120 or the antenna unit 110. For example, a radiation of the lowest frequency band obtained from the antenna unit 110 may be implemented from the first radiating portion 122. For example, a resonance frequency of the first radiating portion 122 may be in a range from about 0.1 GHz to 1.5 GHz.

In an embodiment, a radiation band corresponding to an LTE1 band may be obtained from the first radiating portion 122. In an embodiment, the resonance frequency of the first radiating portion 122 may be in a range from 0.5 GHz to 1 GHz, or from 0.6 GHz to 1 GHz.

As described above, the perimeter of the first radiating portion 122 may have a curved shape. Accordingly, radiation properties from the first radiating portion 122 may be improved, and thus an antenna gain from the antenna unit 110 may be entirely improved.

The second radiating portion 124 may have a second curved perimeter P2. An average resonance frequency of the second radiating portion 124 may be greater than that of the first radiating portion 122. For example, the resonance frequency of the second radiating portion 124 may be in a range from about 1.5 GHz to 6 GHz.

In an embodiment, radiation sections of at least three bands may be obtained from the second radiating portion 124. For example, a broadband radiation including a first radiation band, a second radiation band and a third radiation band may be implemented from the second radiating portion 124.

The first radiation band may cover a radiation band of LTE2 band/2.4 GHz Wi-Fi band. For example, the first radiation band may be in a range from about 1.7 GHz to 3 GHz, or from about 1.7 GHz to 2.7 GHz.

The second radiation band may cover a radiation band of Sub-6 5G. For example, the second radiation band may be in a range from about 3 GHz to 4 GHz, or from about 3.3 GHz to 3.8 GHz.

The third radiation band may cover 5 GHz Wi-Fi band. For example, the third radiation band may be in a range from about 5 GHz to 6 GHz, or from about 5.1 GHz to 5.9 GHz.

The second radiating portion 124 may have a shape in which a pair of second curved perimeters P2 face each other in a convex and symmetrical shape toward a lateral side of the radiator 120. Accordingly, a broadband radiating portion covering the above-described first to third radiation bands may be efficiently implemented.

The first intermediate portion 123 may be disposed between the first radiating portion 122 and the second radiating portion 124. The first intermediate portion 123 may serve as a separation region between the above-described frequency bands of the first radiating portion 122 and the second radiating portion 124.

In exemplary embodiments, the first intermediate portion 123 may have a linear perimeter, and the radiator 120 may have a first recess R1 formed to be concave by the first intermediate portion 123. The recess-shaped intermediate portion may be formed, so that independent radiation properties of the first radiating portion 122 and the second radiating portion 124 may be enhanced. For example, the above-described low-frequency band radiation from the first radiating portion 122 may be prevented from disturbing the broadband radiation of the second radiating portion 124.

The second intermediate portion 125 may be disposed between the transmission line 130 and the second radiating portion 124. A signal having a predetermined impedance transmitted from the transmission line 130 may be sufficiently transferred to the second radiating portion 124 by the second intermediate portion 125 without a signal loss.

In exemplary embodiments, the second intermediate portion 125 may have a linear perimeter. For example, the second intermediate portion 125 may have a rectangular shape. Accordingly, sufficient signal transmission to the second radiating portion 124 may be implemented through the second intermediate portion 125 without an impedance change.

In some embodiments, the radiator 120 may have a second recess R2 formed to be concave by the second intermediate portion 125. Radiation independence and radiation reliability through the second radiation portion 124 may be further improved by the second recess R2.

The transmission line 130 may transmit, e.g., a driving signal or power from a driving integrated circuit (IC) chip to the radiator 120. In some embodiments, the transmission line 130 may include an expanded portion 134 and a feeding portion 132.

For example, the feeding portion 132 may be electrically connected to the driving integrated circuit chip through an antenna cable. The expanded portion 134 may have a shape in which a line width is expanded from the feeding portion 132. For example, a width of the expanded portion 134 may be gradually increased in a direction from the feeding portion 132 to the second intermediate portion 125.

The expanded portion 134 may serve as an impedance matching pattern that may transmit a signal transmitted from the feeding portion 132 to the second intermediate portion 125 with a predetermined impedance.

The guide pattern 140 may be disposed around the transmission line 130 to be spaced apart from the radiator 120 and the transmission line 130. For example, a pair of the guide patterns 140 may be disposed to face each other with the transmission line 130 interposed therebetween.

The guide pattern 140 may promote a power and signal transmission from the transmission line 130 to the radiator 120. For example, the guide pattern 140 may serve as a coplanar waveguide (CPW) pattern.

In exemplary embodiments, the guide pattern 140 may serve as an auxiliary radiator. For example, the third radiating portion 126 may be defined by an electrical coupling between the guide pattern 140 and the expanded portion 134 of the transmission line 130.

In some embodiments, an average resonance frequency of the third radiating portion 126 may be greater than that of the second radiating portion 124. In an embodiment, the radiation of the above-described second radiation band and the third radiation band implemented in the second radiating portion 124 may be added from the third radiating portion 126.

Accordingly, gains corresponding to the second radiation band and the third radiation band which are relatively high-frequency bands may be increased, and properties of frequency independence and frequency separation may be improved.

The guide pattern 140 and the expanded portion 134 may each have a tapered side. As illustrated in FIG. 1, the guide pattern 140 may have a first tapered lateral side TS1, and the expanded portion 134 may have a second tapered lateral side TS2. The first tapered lateral side TS1 and the second tapered lateral side TS2 may face each other to be spaced apart from each other.

The coupling of the guide pattern 140 and the expanded portion 134 may be facilitated by the above-described tapered lateral sides TS1 and TS2. Additionally, impedance matching of the antenna unit 110 may be implemented through the tapered shape of the expanded portion 134 as described above.

The above-described first radiating portion 122, the first intermediate portion 123, the second radiating portion 124 and the second intermediate portion 125 may be integrally formed as a single member. In some embodiments, the radiator 120 and the transmission line 130 may also be formed as an integral single member.

The antenna unit 110 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in a combination of at least two therefrom.

In an embodiment, the antenna unit 110 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna unit 110 may include a transparent conductive oxide such as indium tin oxide (ITO), indium zinc oxide (IZO), indium zinc tin oxide (ITZO), zinc oxide (ZnOx), etc.

In some embodiments, the antenna unit 110 may include a stacked structure of a transparent conductive oxide layer and a metal layer. For example, the antenna unit 110 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In an embodiment, the antenna unit 110 may include a metamaterial.

In some embodiments, the antenna unit 110 may include a blackened portion, so that a reflectance at a surface of the antenna unit 110 may be decreased to suppress a visual pattern recognition due to a light reflectance.

In an embodiment, a surface of the metal layer included in the antenna unit 110 may be converted into a metal oxide or a metal sulfide to form a blackened layer. In an embodiment, a blackened layer such as a black material coating layer or a plating layer may be formed on the antenna unit 110 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

According to the above-described exemplary embodiments, the radiator 120 may include a plurality of curved peripheral regions separated by at least one linear peripheral region, and an uppermost portion of the radiator may have the first curved perimeter P1. Accordingly, a broadband antenna capable of radiating in a plurality of frequency bands with high independence and improved gain may be provided. In exemplary embodiments, radiation properties of at least three frequency bands may be implemented from the antenna unit 110.

Further, a radiation gain in a high frequency band may be added by utilizing the coupling effect of the guide pattern 140.

Figure 3:
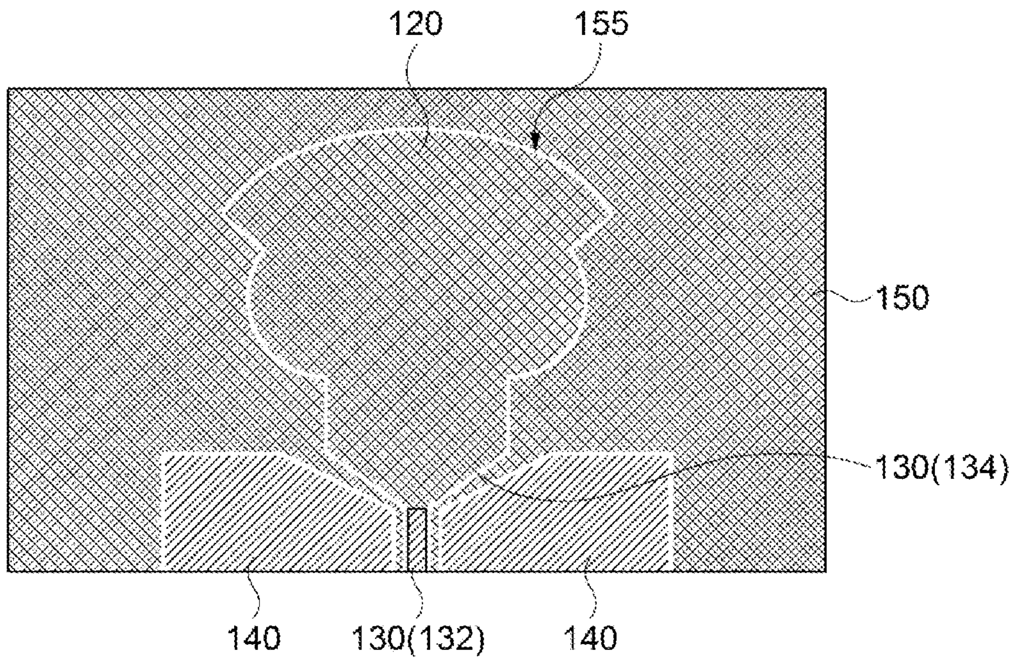
FIG. 3 is a schematic plan view illustrating an antenna structure in accordance with exemplary embodiments.

FIG. 3 is a schematic plan view illustrating an antenna structure in accordance with exemplary embodiments.

Referring to FIG. 3, the antenna structure may further include a dummy mesh pattern 150 disposed around the antenna unit 110. For example, the dummy mesh pattern 150 may be electrically and physically separated from the antenna unit 110 by a separation region 155.

For example, a conductive layer including the above-described metal or alloy may be formed on the dielectric layer 105. A mesh structure may be formed while the conductive layer is etched along a profile including the linear perimeter region and the curved perimeter region of the antenna unit 110 as described above. Accordingly, the antenna unit 110 and the dummy mesh pattern 150 spaced apart from each other by the separation region 155 may be formed.

In some embodiments, the antenna unit 110 may also share the mesh structure. Accordingly, transmittance of the antenna unit 110 may be improved, and the dummy mesh pattern 150 may be distributed so that optical properties around the antenna unit 110 may become uniform. Thus, the antenna unit 110 may be prevented from being visually recognized.

In an embodiment, the antenna unit 110 may entirely include the mesh structure. In an embodiment, at least a portion of the transmission line 130 may include a solid structure for a feeding efficiency. For example, the feeding portion 132 of the transmission line 130 may have a solid structure.

In an embodiment, the guide pattern 140 may also have a solid structure, and the auxiliary radiation may be promoted through the above-described coupling effect.

The dummy mesh pattern 150 may include conductive lines intersecting each other to form the mesh structure. In some embodiments, the dummy mesh pattern 150 may include cut regions at which the conductive lines are cut. Accordingly, the radiation properties of the antenna unit 110 may be prevented from being disturbed by the dummy mesh pattern 150.

Figure 4:
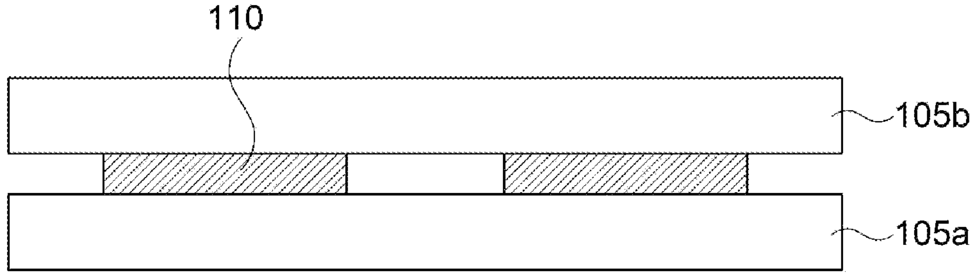
FIG. 4 is a schematic cross-sectional view illustrating an antenna structure in accordance with exemplary embodiments.

FIG. 4 is a schematic cross-sectional view illustrating an antenna structure in accordance with exemplary embodiments.

Referring to FIG. 4, the antenna unit 110 may be disposed between a first dielectric layer 105*a* and a second dielectric layer 105*b*. For example, the antenna unit 110 may be sandwiched or buried between the first and second dielectric layers 105*a* and 105*b*.

The first and second dielectric layers 105*a* and 105*b* may be disposed at upper and lower areas of the antenna unit 110, so that dielectric and radiation environments around the antenna unit 110 may become uniform.

In some embodiments, the second dielectric layer 105*b* may serve as a protective film of the antenna unit 110 or the antenna structure.

In some embodiments, the antenna structure may include two or more antenna units 110. For example, a plurality of the antenna units 110 may be arranged to form an array. Accordingly, an overall gain of the antenna structure may be increased.

Figure 5:
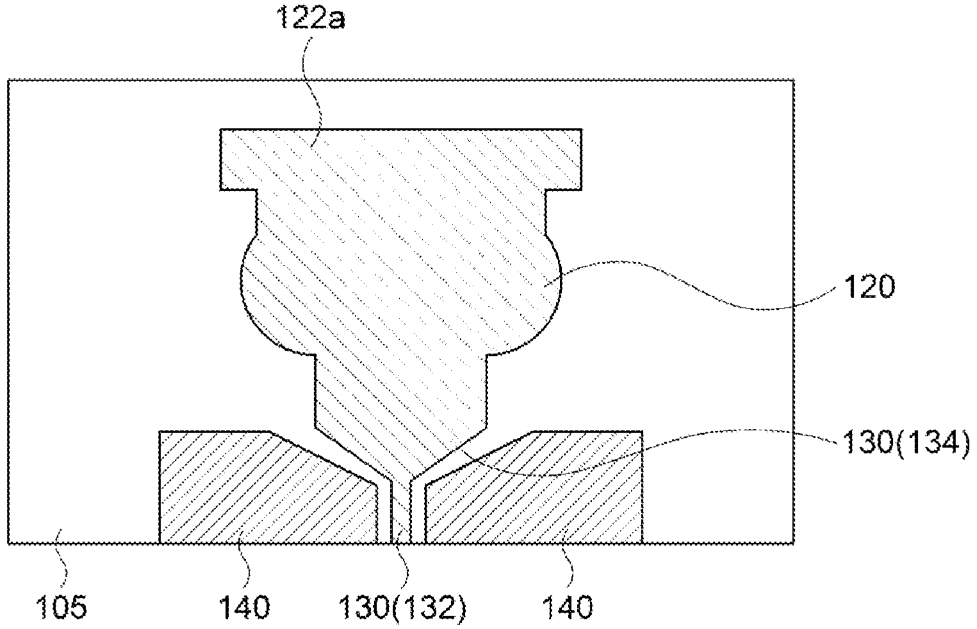
FIG. 5 is a schematic cross-sectional view illustrating an antenna structure in accordance with Comparative Example.
Figure 6:
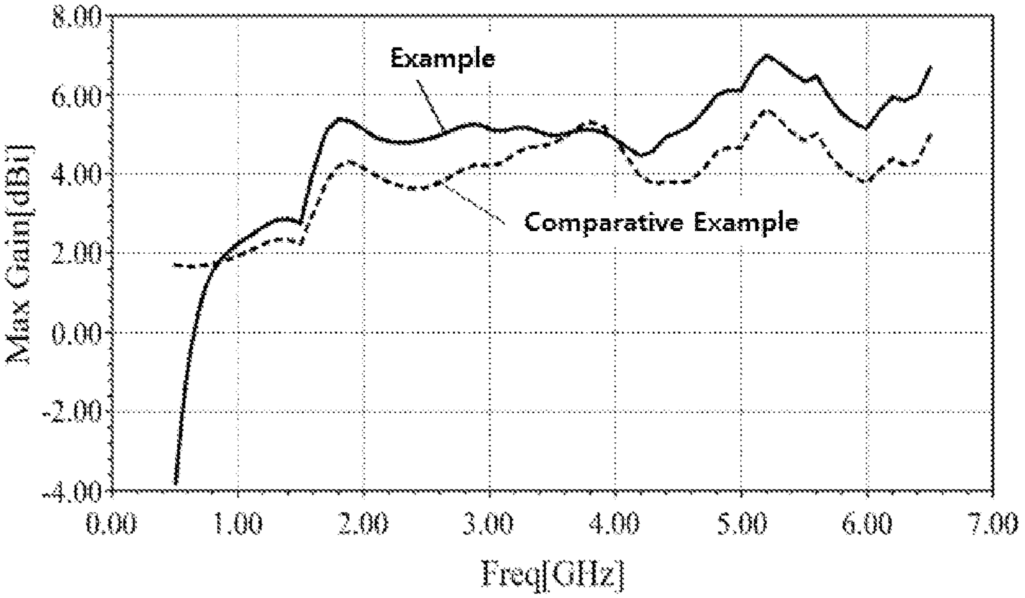
FIG. 6 is a graph showing antenna gain simulation results from antenna structures of Example and Comparative Example.

FIG. 5 is a schematic cross-sectional view illustrating an antenna structure in accordance with Comparative Example. FIG. 6 is a graph showing antenna gain simulation results from antenna structures of Example and Comparative Example.

Specifically, FIG. 6 is a graph obtained by manufacturing the antenna structure according to Example having the structure illustrated in FIG. 1 and the antenna structure according to Comparative Example as illustrated in FIG. 5, and then measuring gain values in a radiation chamber under the same conditions.

As illustrated in FIG. 5, the antenna structure of Comparative Example was manufactured to have the same material and the same size as those of the antenna structure of Example, except that the first radiating portion 122*a* had a rectangular shape from which the curved perimeter was removed.

Referring to FIG. 6, in the antenna structure of Example where the curved perimeter was formed at an uppermost portion, the gain value was increased as a whole from a low frequency to a high frequency band.

The above-described antenna structure may be applied to various structures and objects such as a building, a window, a vehicles, a decorative sculpture, a guide sign (e.g., a direction sign, an emergency exit sign, an emergency light), and may be provided as a relay antenna structure.

Figure 7:
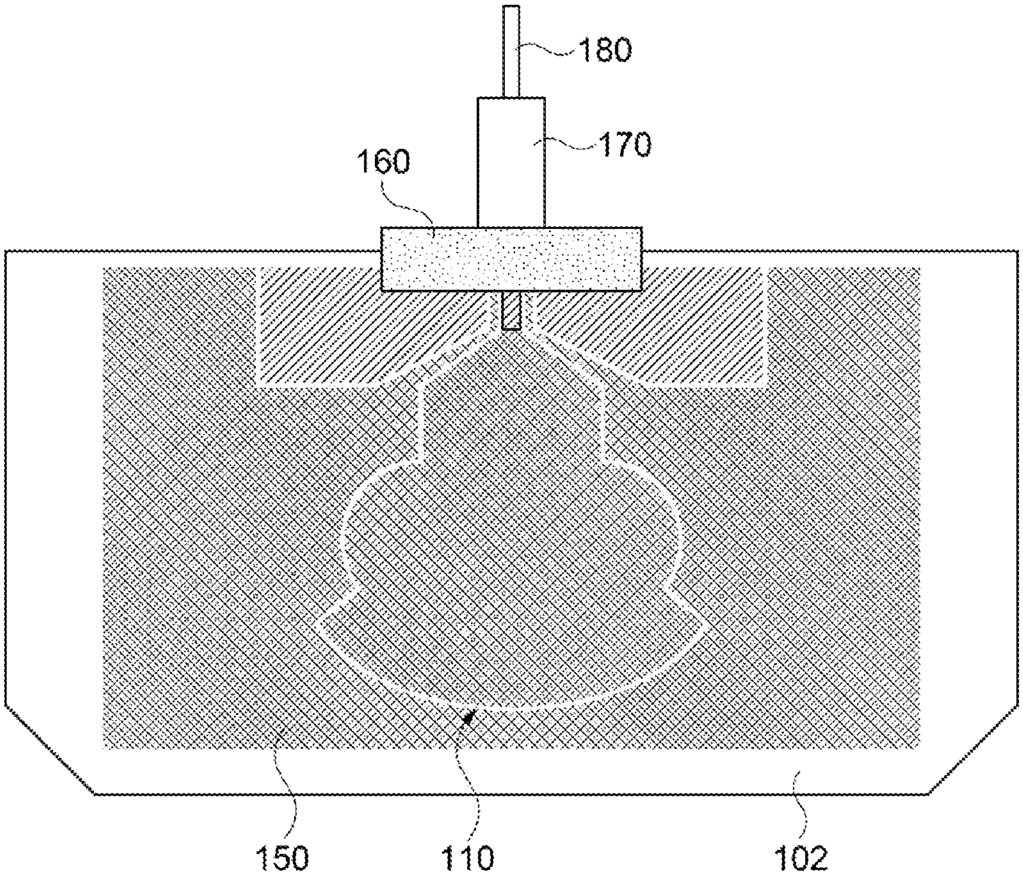
FIG. 7 is a schematic view illustrating a repeater to which an antenna structure in accordance with exemplary embodiments is applied.

FIG. 7 is a schematic view illustrating a repeater to which an antenna structure in accordance with exemplary embodiments is applied. For example, FIG. 7 shows an antenna structure provided as a relay antenna structure.

Referring to FIG. 7, the antenna structure may have a structure capable of being fixed to a building structure such as a wall or a ceiling. For example, the above-described antenna unit 110 may be inserted or attached to a substrate 102.

For example, the substrate 102 may be provided as the dielectric layer 105 described with reference to FIG. 1, and the first dielectric layer 105*a* and the second dielectric layer 105*b* may be provided together as the substrate 102 as described with reference to FIG. 4. The antenna unit 110 may be embedded in the substrate 102. The substrate 102 may be provided as various decorative structures, indicating signs, etc.

In some embodiments, the above-described antenna structure may be attached to the substrate 102 in the form of a film.

In some embodiments, as described above, the dummy mesh pattern 150 may be formed around the antenna unit 110 to reduce or prevent the antenna unit 110 from being visually recognized. At least a portion of the antenna unit 110 may also have a mesh pattern structure.

A first fixing unit 160 may be combined with one side of the substrate 102 to be coupled to the feeding portion 132 of the transmission line 130. The first fixing unit 160 may have, e.g., a clamp shape. A second fixing unit 170 may be inserted into a wall or ceiling to be included in the antenna structure so as to fix the antenna structure. The second fixing unit 170 may have, e.g., a screw shape.

An antenna cable 180 may be inserted into the second fixing unit 170 and the first fixing unit 160 to supply a power to the feeding portion 132 of the antenna unit 110.

The antenna cable 180 may be embedded in, e.g., an inner wall of a building or a window of a vehicle to be coupled to an external power source, an integrated circuit chip or an integrated circuit board. Accordingly, power may be supplied to the antenna unit 110 to perform an antenna radiation.

What is claimed is:

1. An antenna structure comprising:

a dielectric layer;

a transmission line disposed on the dielectric layer;

a guide pattern disposed around the transmission line and physically spaced apart from the radiator and the transmission line, wherein the guide pattern has a first tapered lateral side, and the transmission line has a second tapered lateral side; and a radiator disposed on the dielectric layer to be connected to the transmission line, the radiator having a linear perimeter region and a plurality of curved perimeter regions separated by the linear perimeter region, wherein an outermost portion of the radiator from the transmission line in a plan view has any one of the curved perimeter regions, wherein the transmission line and the radiator are formed as an integral single member, and the transmission line and the radiator are in contact with a top surface of the dielectric layer.

2. The antenna structure of claim 1, wherein the radiator comprises a first radiating portion and a second radiating portion that are separated by the linear perimeter region.

3. The antenna structure of claim 2, wherein the curved perimeter regions comprise a first curved perimeter and a second curved perimeter; and the first radiating portion has the first curved perimeter, and the second radiating portion has the second curved perimeter.

4. The antenna structure of claim 3, wherein the radiator further comprises a first intermediate portion disposed between the first radiating portion and the second radiating portion.

5. The antenna structure of claim 4, wherein a first recess is formed at a boundary between the first radiating portion and the first intermediate portion.

6. The antenna structure of claim 4, wherein the radiator further comprises a second intermediate portion disposed between the second radiating portion and the transmission line.

7. The antenna structure of claim 6, wherein a second recess is formed at a boundary between the second radiating portion and the second intermediate portion.

8. The antenna structure of claim 6, wherein the first intermediate portion and the second intermediate portion each has a linear perimeter.

9. The antenna structure of claim 3, wherein an average resonance frequency of the second radiating portion is greater than an average resonance frequency of the first radiating portion.

10. The antenna structure of claim 9, wherein the second radiating portion has a radiation band of at least three frequency bands.

11. The antenna structure of claim 1, wherein the first tapered lateral side and the second tapered lateral extend to face each other.

12. The antenna structure of claim 11, wherein the transmission line comprises a feeding portion and an expanded portion extending from the feeding portion to be connected to the radiator, and the expanded portion has the second tapered lateral side.

13. The antenna structure of claim 12, wherein a pair of the guide patterns face each other with the feeding portion interposed therebetween.

14. The antenna structure of claim 1, wherein the guide pattern serves as an auxiliary radiator through a coupling with the transmission line.

15. A repeater comprising the antenna structure of claim 1.

* * * * *